M. J. BRASSELL.
HORSE BOOT.
APPLICATION FILED SEPT. 29, 1910.
997,487.
Patented July 11, 1911.
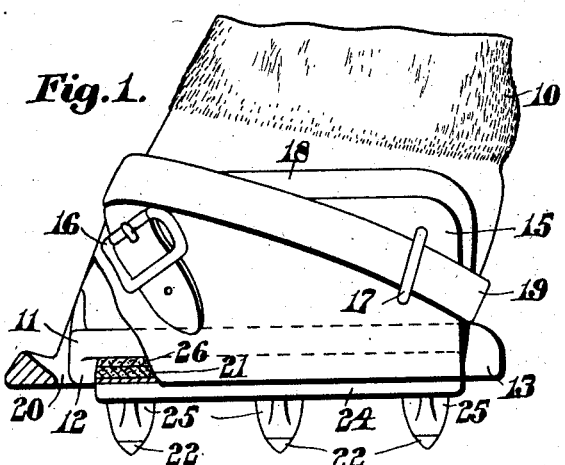
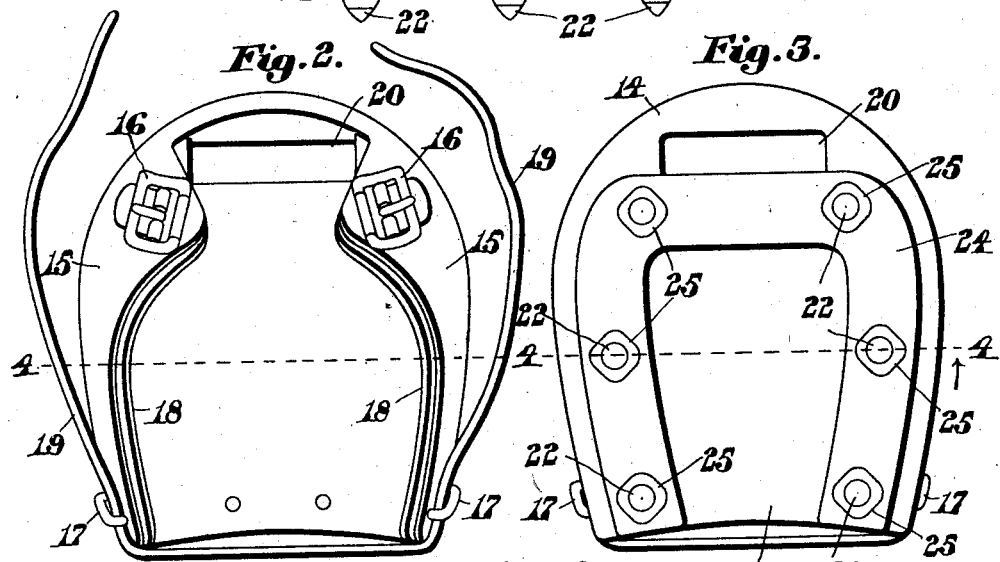
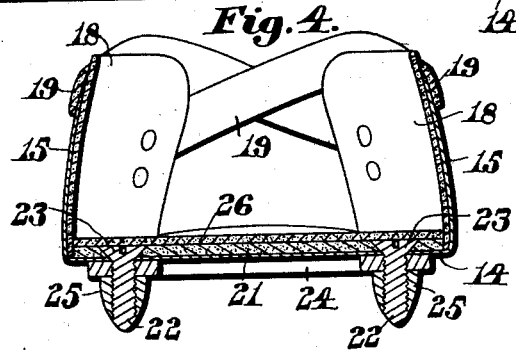
Witnesses:
Nathan C. Lombard.
Mary C. Smith.
Inventor:
Michael J. Brassell,
by Walter E. Lombard,
Atty.

UNITED STATES PATENT OFFICE.

MICHAEL J. BRASSELL, OF CAMBRIDGE, MASSACHUSETTS.

HORSE-BOOT.

997,487.  Specification of Letters Patent.  Patented July 11, 1911.

Application filed September 29, 1910. Serial No. 584,772.

*To all whom it may concern:*

Be it known that I, MICHAEL J. BRASSELL, a citizen of the United States of America, and a resident of Cambridge, in the county of Middlesex and State of Massachusetts, have invented certain new and useful Improvements in Horse-Boots, of which the following is a specification.

This invention relates to horse boots and particularly to horse boots having supplemental shoes provided with anti-slipping devices, said boots being adapted to be applied to the hoofs of horses over the ordinary iron shoes when the streets or roads are slippery, or as emergency shoes by applying the boots to the hoofs when the horse has cast a shoe.

The main object of the invention is to produce a boot of this class which may be securely applied to the hoof in such a manner that it cannot be taken from the hoof, and which will be easy upon the hoof and ankle, thus obviating the objections usually met with by devices of this class on account of worrying the animal.

This invention consists of certain novel features of construction and arrangement of parts which will be readily understood by reference to the description of the drawings and to the claims hereinafter given.

Of the drawings: Figure 1 represents an elevation of a device embodying the features of the present invention, shown applied to the hoof of an animal to which the ordinary shoe is fastened. Fig. 2 represents a plan view of the device itself with the securing straps shown removed from the fastening buckles. Fig. 3 represents an inverted plan of the same, and Fig. 4 represents a transverse section of the same, the cutting plane being on line 4—4 on Fig. 3, looking in the direction of the arrow.

Similar characters designate like parts throughout the several figures of the drawings.

In the drawings, 10 represents a horse's hoof to which is fastened in the usual manner the shoe 11, provided with the toe calk 12 and the heel calks 13. The boot itself consists of a thin metal plate 14 provided with upwardly extending side members 15 curved to fit the hoof of a horse. To each side member 15, near the forward end thereof, is riveted a fastening buckle 16, and each member 15 is provided near its rear end on its outer face with a staple 17. The metal side members 15 are sprung sufficiently in applying them to the hoof to permit them to pass over the widest portion of the hoof, and when in place upon the hoof these side members 15 will spring into position in close contact with the hoof. Each side member is provided with a lining 18, of leather or other yielding material, the upper and rear edges of which extend beyond the upper and rear edges of the side members 15, thereby preventing any irritation to the hoof by contact of the edges of these metal side members 15 with the surface of the hoof.

The single strap 19 passes around the rear of the hoof, just above the shoe 11, and the ends are crossed in front of the hoof and secured to the fastening buckles 16 in the usual manner, thereby locking the boot securely to the hoof 10, so that it cannot become displaced therefrom.

The bottom 14 is provided with an opening 20 near its front end, through which the toe calk of the ordinary shoe extends, the rear edge of this toe calk contacting with the rear side of the opening 20, while the front faces of the heel calks 13 similarly register with the rear edge of said bottom plate 14, thereby preventing any longitudinal movement of the boot when in position.

Superimposed upon the metal bottom plate 14 is a pad 21 of leather or other yieldable material, and extending through this pad 21 is a plurality of counter-sunk threaded members or screws 22, the heads 23 of which are embedded in said pad 21. Fitting over these threaded members 22 is a supplemental shoe 24 provided with a plurality of openings therethrough for the reception of said screws or members 22. This supplemental shoe 24 is held in position against the under side of the bottom plate 14 by means of a plurality of nuts 25, one upon each of said threaded members 22. The nuts 25 serve not only as a positive securing means for locking the pad 21, the metal bottom plate 14 and the supplemental shoe 24 rigidly together, but they also serve to protect the threads of the members 22. The outer ends of the members 22 are pointed and the nuts 25 are tapered to conform to the pointed ends of the members 22, thereby forming a plurality of calks that will secure a firm hold upon the ice or slippery pavements over which the horse may be moving. When one of these members 22 becomes broken, the nut 25 may be quickly removed and the broken member 22 replaced by a new one. Superimposed upon the pad 21, and extending from the heads 23 of the members 22 is a pad 26 of leather or other yieldable material, upon which the bottom of the hoof 10 rests when the boot is in position thereon. It is obvious, therefore, that the construction of the boot provides a protection to the hoof 10, so that none of the metal parts are in contact with the horse's hoof to cause any irritation thereto. When the horse casts a shoe the boot may be used as an emergency shoe by being secured to the hoof in the same manner, and used until a new shoe can be placed upon the horse's hoof.

It is believed that the operation and many advantages of a device of this construction will be readily understood without any further description.

Having thus described my invention, I claim:

1. In an article of the class described, the combination of a supplemental shoe; means for securing it to the hoof of a horse including a plate adapted to extend over the bottom of said hoof; threaded members extending downwardly from said plate through said shoe; and nuts secured to said threaded members beneath the shoe.

2. In an article of the class described, the combination of a supplemental shoe; means for securing it to the hoof of a horse including a plate adapted to extend over the bottom of said hoof; a pad of yieldable material superimposed over the entire upper face of said plate; threaded members having heads embedded in the upper face of said pad and extending through said plate and shoe; and nuts secured to said threaded members beneath said shoe.

3. In an article of the class described, the combination of a supplemental shoe; means for securing it to the hoof of a horse including a plate adapted to extend over the bottom of said hoof; threaded members extending downwardly through said plate and shoe; nuts secured to said threaded members beneath said shoe; and a pad interposed between the heads of said threaded members and said hoof.

4. In an article of the class described, the combination of a supplemental shoe provided with calks and adapted to fit between the toe and heel calks of an ordinary shoe; a boot secured thereto and provided with side members adapted to fit over the hoof of a horse; and means on said side members for securing said boot to said hoof.

5. In an article of the class described, the combination of a supplemental rigid shoe provided with calks and adapted to fit between the toe and heel calks of an ordinary shoe; a boot secured thereto and provided with side members adapted to fit over the hoof of a horse; a lining for said boot of yielding material; and means on side members for securing said boot to said hoof.

6. In an article of the class described, a boot adapted to fit over the hoof of a horse and having openings in its bottom to receive the toe and heel calks of the shoe on said hoof; a supplemental shoe; a plurality of threaded members extending through the bottom of said boot and through said supplemental shoe; a nut on each of said threaded members beneath said supplemental shoe; and means for securing said boot to said hoof.

7. In an article of the class described, a boot adapted to fit over the hoof of a horse and having openings in its bottom to receive the toe and heel calks of the shoe on said hoof; a supplemental shoe; a plurality of threaded members extending through the bottom of said boot and through said supplemental shoe; a nut on each of said threaded members beneath said supplemental shoe; means for securing said boot to said hoof; and a pad superimposed upon the bottom plate of said boot.

Signed by me at 4 Post Office Sq., Boston, Mass., this 28th day of September, 1910.

MICHAEL J. BRASSELL.

Witnesses:
WALTER E. LOMBARD,
NATHAN C. LOMBARD.

---

Copies of this patent may be obtained for five cents each, by addressing the "Commissioner of Patents, Washington, D. C."